United States Patent
Shino

(10) Patent No.: US 10,063,177 B2
(45) Date of Patent: Aug. 28, 2018

(54) METHOD AND APPARATUS FOR OPTIMIZING EFFICIENCY OF INDUCTION MOTOR IN ELECTRIC VEHICLE

(71) Applicant: Ikoku Shino, Kanagawa (JP)

(72) Inventor: Ikoku Shino, Kanagawa (JP)

(73) Assignee: Ikoku Shino, Kanagawa (JP)

( * ) Notice: Subject to any disclaimer, the term of this patent is extended or adjusted under 35 U.S.C. 154(b) by 14 days.

(21) Appl. No.: 15/322,115

(22) PCT Filed: Jun. 23, 2015

(86) PCT No.: PCT/JP2015/068105
§ 371 (c)(1),
(2) Date: Dec. 25, 2016

(87) PCT Pub. No.: WO2016/006439
PCT Pub. Date: Jan. 14, 2016

(65) Prior Publication Data
US 2017/0141711 A1 May 18, 2017

(30) Foreign Application Priority Data

Jul. 7, 2014 (CN) .......................... 2014 1 0320838
Nov. 20, 2014 (JP) ................................ 2014-248381

(51) Int. Cl.
*H02P 21/00* (2016.01)
*B60L 11/18* (2006.01)
(Continued)

(52) U.S. Cl.
CPC ........ *H02P 21/001* (2013.01); *B60L 11/1803* (2013.01); *B60L 15/025* (2013.01);
(Continued)

(58) Field of Classification Search
CPC ... H02P 21/001; B60L 11/1803; B60L 15/025
(Continued)

(56) References Cited

U.S. PATENT DOCUMENTS

2010/0315034 A1* 12/2010 Lu .................... H02P 23/0077
318/802
2010/0327786 A1* 12/2010 Aoki ................. G01D 5/24452
318/400.04
(Continued)

*Primary Examiner* — Eduardo Colon Santana
*Assistant Examiner* — Devon Joseph
(74) *Attorney, Agent, or Firm* — PatShegen IP; Eva Taksel

(57) ABSTRACT

The present invention is to adjust the relevant parameters at the variable load factor of the motor of the electric vehicle and the arbitrary rotational speed through the optimization algorithm and to operate with high efficiency over the whole range. In order to optimize the efficiency of the motor for the electric vehicle, the optimization control device 20 obtains the operating load factor in real time with the algorithm 9 for calculating the load factor, the rotation speed ω is obtained by ω detection 6, the power factor PF is acquired by the PF calculation 4, and the torque current component Iq and the magnetic field current component Id are acquired by the Id and Iq conversion algorithm 5, respectively. Then, the frequency (rotational speed) control amount Fq is calculated by the ω control 1, the control amount Idk of the magnetic field current by the fuzzy control 2, and the control amount PFk of the power factor by the PF control 3, respectively, each of which is input to the optimum voltage calculation algorithm 7 for calculating the optimum voltage control amount Ud. With the optimum voltage control amount Ud and the frequency (rotation speed) control amount Fq, the waveform of the SPWM generation 8 is adjusted, and the input power of the induction motor 17 is automatically adjusted to the minimum value and high efficiency by the power adjustment unit 12.

8 Claims, 5 Drawing Sheets

(51) Int. Cl.
  *B60L 15/02* (2006.01)
  *B60L 15/20* (2006.01)
  *H02P 27/08* (2006.01)
(52) U.S. Cl.
  CPC .......... *B60L 15/2045* (2013.01); *H02P 27/08*
    (2013.01); *B60L 2240/423* (2013.01); *B60L*
    *2240/429* (2013.01); *B60Y 2200/91* (2013.01);
    *B60Y 2400/112* (2013.01); *Y02T 10/7258*
    (2013.01)
(58) Field of Classification Search
  USPC ......................................................... 318/767
  See application file for complete search history.

(56) References Cited

U.S. PATENT DOCUMENTS

| | | | | |
|---|---|---|---|---|
| 2011/0241583 A1* | 10/2011 | He | ...................... | H02P 21/0021 318/400.09 |
| 2011/0241584 A1* | 10/2011 | He | ........................... | H02P 6/08 318/400.09 |
| 2011/0241888 A1* | 10/2011 | Lu | ........................ | F04D 15/0077 340/626 |
| 2011/0248663 A1* | 10/2011 | Yamakawa | ............. | B60L 11/08 318/805 |
| 2011/0309778 A1* | 12/2011 | Iwahori | ..................... | B60L 7/14 318/400.3 |
| 2011/0313717 A1* | 12/2011 | Lu | ........................... | G01P 3/48 702/147 |
| 2012/0091931 A1* | 4/2012 | Beck | ........................ | H02P 9/04 318/142 |
| 2012/0280645 A1* | 11/2012 | Olsson | ................ | H02P 23/0077 318/802 |
| 2014/0009102 A1* | 1/2014 | Lu | ............................ | G01P 3/48 318/808 |
| 2016/0254772 A1* | 9/2016 | Liao | ........................ | H02P 21/05 318/702 |
| 2017/0093324 A1* | 3/2017 | Saha | ..................... | H02P 29/024 |

* cited by examiner

[FIG. 1]
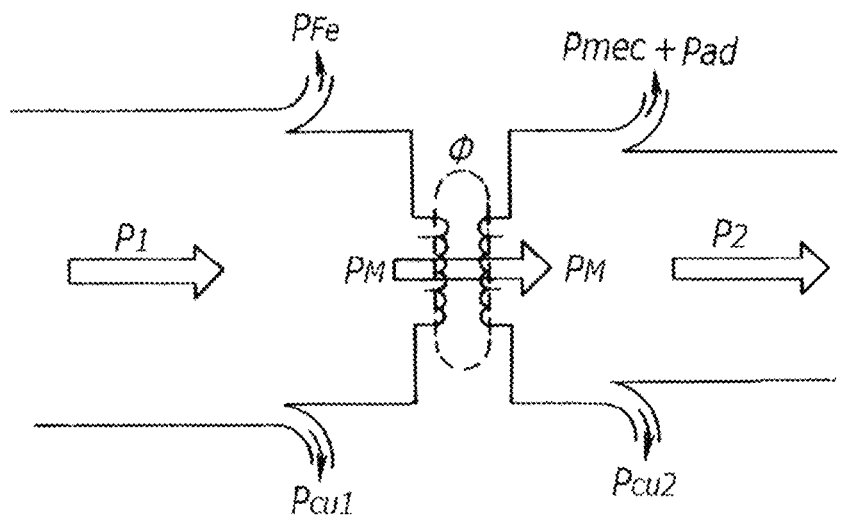

[FIG. 2]
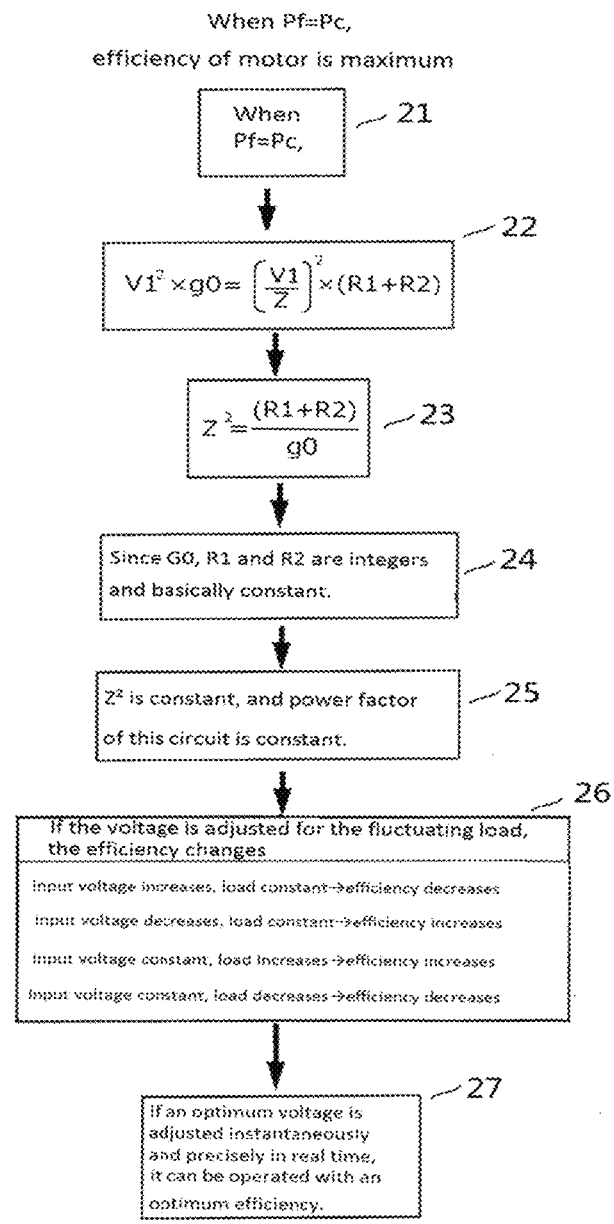

[FIG. 3]
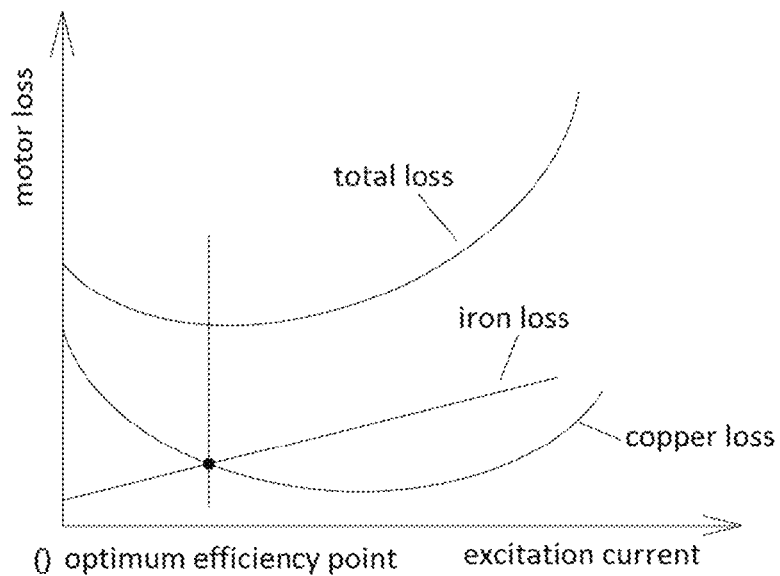
[FIG. 4]
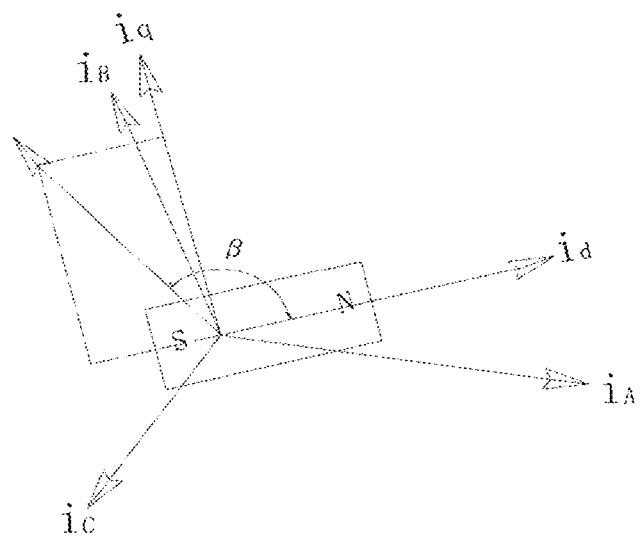

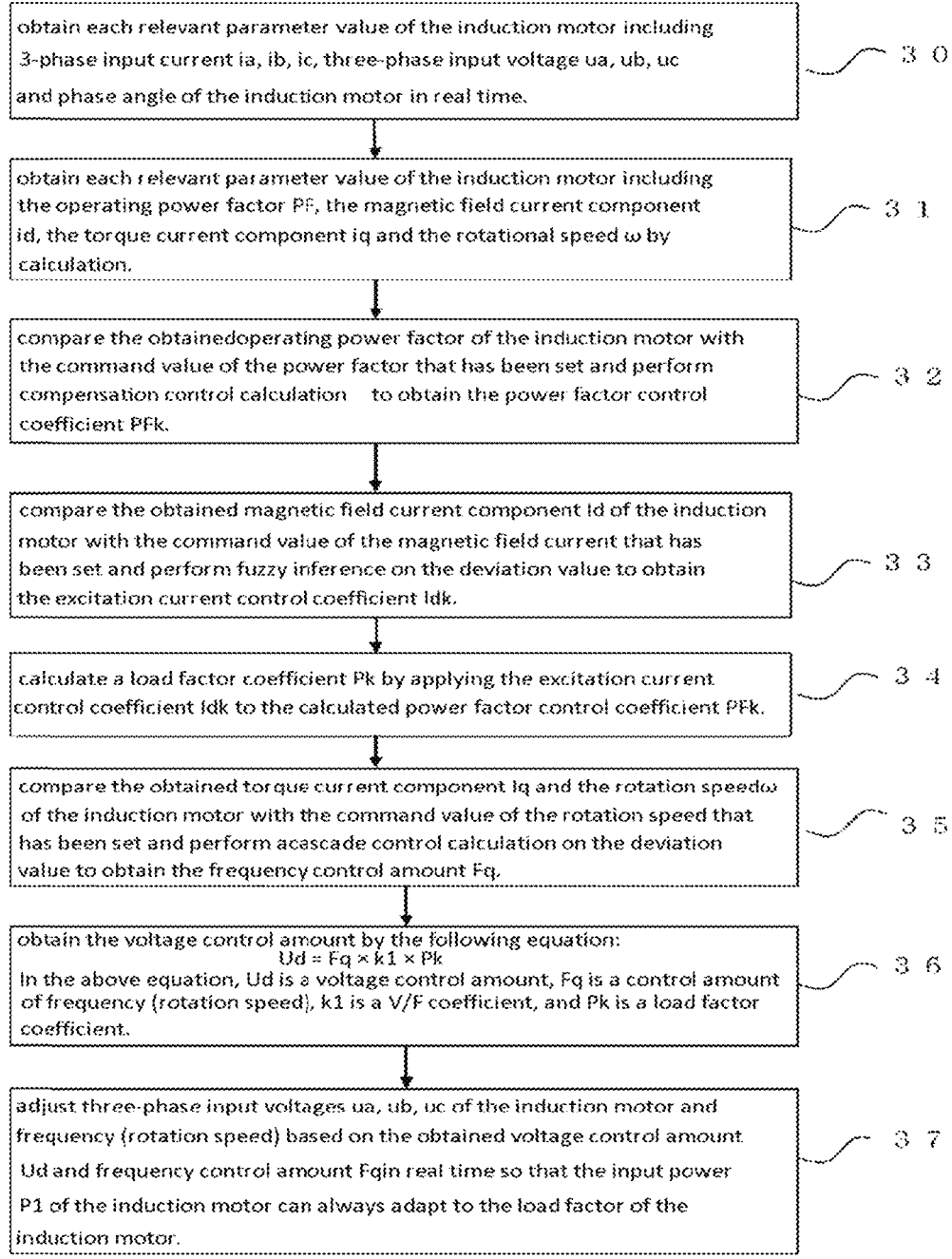

[FIG. 6]
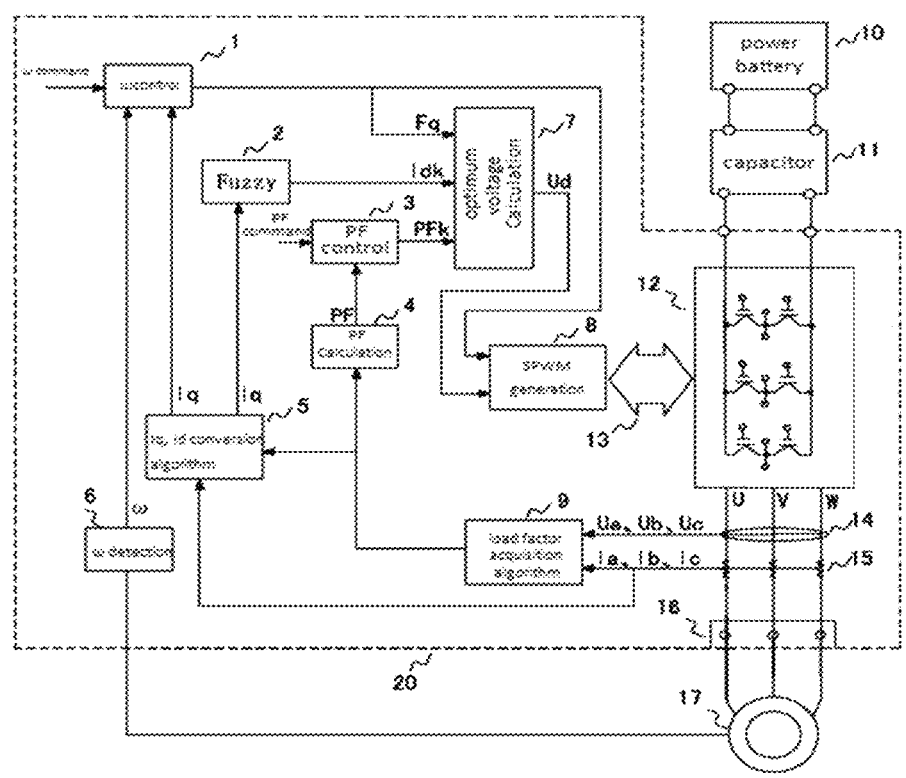

METHOD AND APPARATUS FOR OPTIMIZING EFFICIENCY OF INDUCTION MOTOR IN ELECTRIC VEHICLE

TECHNICAL FIELD

The present invention relates to the field of control of an induction motor in an electric vehicle, and more particularly, to a control method, apparatus and system for optimizing the efficiency of an induction motor.

BACKGROUND OF ART

The control device of induction motors in electric vehicles is one of the important parts of electric vehicles. Its main use is to maximize the output efficiency of induction motor by operating the electric vehicle according to the determined direction, speed, angle and reaction time. Because induction motors have advantages such as low cost, high stability, high speed, low torque fluctuation/noise and position sensor-less, they are now widely adopted as induction motors which are most suitable for electric vehicles. However, when the induction motor is operated in a medium and low load state, copper loss and iron loss increase due to an increase in the reactive power of the induction motor, and the operation efficiency and the power factor of the induction motor decrease greatly, which causes a big problem including the occurrence of severe and wasteful power consumption. In the case of an electric vehicle, the use time and travel distance of the charged battery are significantly shortened.

According to the present invention, when the total load of the induction motor of the electric vehicle greatly changes, the variation of the load factor and the rotation speed can be detected in real time, and the input power of the induction motor can be adapted to the total load of the electric vehicle at all times. If the total load of the electric vehicle is less than the input power of the induction motor, the input power of the induction motor is automatically adjusted to a minimum value; when the maximum load of the electric vehicle is reached, the input electric power of the induction motor of the electric vehicle is automatically adjusted to a maximum value, according to an efficiency optimizing method and a control device, and the main role of which is to improve output efficiency of the induction motor through the control of the relevant parameters of the induction motor.

PRIOR ART DOCUMENT

Non-Patent Document

[Non-patent Document 1] Masayasu Ezaki "Vector Control Technology of Brushless DC motor" CQ Publisher 2013

DETAILED DESCRIPTION OF THE INVENTION

Technical Problem

Currently, in the control technology of an induction motor for an electric vehicle in the industry, the following control methods are mainly used: (1) conventional inverter control method; (2) vector control method, etc. In these techniques, driving torque is attracting attention. However, since the vehicle always operates at a rated fixed voltage, the fluctuation of the induction motor load due to various factors during driving (for example, traveling speed, uphill slope, downhill slope, road conditions, weight bearing, etc.) is ignored, which is a common defect in these technologies. This is a problem to be solved by the present invention.

Technical Solution

In order to solve this problem, the present invention proposes a new method and apparatus for optimizing efficiency of an induction motor that instantaneously and precisely acquires the load factor of the induction motor in real time, adjusts the input voltage and frequency of the induction motor in real time, based on control amounts of the voltage and frequency which constantly operates the induction motor at a variable load factor and an arbitrary frequency with high efficiency through an optimization algorithm, and always allows the input power of the induction motor to adapt to the load factor of the induction motor.

The proposed method of optimizing efficiency of the induction motor acquires control amounts of the voltage and the frequency all at once, instantaneously and accurately, which always operate the induction motor in a highly efficient state at a variable load factor and an arbitrary frequency (rotation speed) through an optimization algorithm, adjusts input voltage and frequency of the induction motor in real time based on these control amounts of the voltage and frequency, allows the input power of the induction motor to adapt to the load factor of the induction motor at all times, and ensures that the induction motor operates at high efficiency in the energy saving state with the minimum current and the optimum voltage. The technical problems of the conventional technology including: an increase in the copper loss and iron loss due to an increase in the reactive power of the induction motor with medium and low load, a drastic reduction in the operation efficiency and the power factor of the induction motor, and the occurrence of consumption of severe and wasteful power, have been resolved.

Advantageous Effects

According to the present invention, the energy-saving state operation at the minimum current and the optimum voltage of the induction motor was realized. This method has the following advantages: 1) Copper loss and iron loss of the induction motor are greatly reduced, and operation efficiency is improved;

2) The reactive power of the induction motor is greatly reduced, and the power factor is improved;

3) The effective power of the induction motor is greatly reduced, and the effective power is saved;

4) Operating temperature rise and noise of the induction motor are greatly reduced, and the life of the induction motor is extended;

5) Since the reactive power and the effective power of the induction motor are also the electric power of the storage battery, the cruising time and the traveling distance of the charged electric storage battery of the electric vehicle are greatly extended by saving the reactive power and the effective power.

BRIEF DESCRIPTION OF DRAWINGS

FIG. 1 is an operation efficiency η model of an induction motor.

FIG. 2 illustrates a flowchart of a first embodiment of the efficiency optimizing method of the induction motor.

FIG. 3 shows a high efficiency operation point of the induction motor in the method for optimizing efficiency of the induction motor according to the present invention.

FIG. 4 is a vector diagram showing a three-phase AC coordinate system and a three-phase DC coordinate system in the method for optimizing efficiency.

FIG. 5 illustrates a flowchart of a second embodiment of the method for optimizing efficiency of the induction for according to the present invention.

FIG. 6 is a structural diagram of a second embodiment of the control apparatus for optimizing efficiency of the induction motor according to the present invention.

DETAILED DESCRIPTION OF THE EMBODIMENTS

Next, the present invention will be described in detail with reference to a first embodiment and explanatory drawings.

From the operation efficiency η model of the induction motor shown in FIG. 1, the operation efficiency η of the induction motor can be calculated by the following equation:

$$\eta = \frac{P_2}{P_1}$$
$$= \frac{P_2}{P_2 + (P_{cu1} + P_{cu2}) + (P_{re} + P_{mec} + P_{ad})}$$

wherein:

P1 is an input capacity of the induction motor;

P2 is an output capacity of the induction motor (an output capacity of the shaft);

Pcu1 is a copper loss of the stator, i.e. a power loss that occurs when the stator current flows through the stator winding, the magnitude of which depends on the load;

Pcu2 is a rotating copper loss, i.e. a power loss that occurs when the current flows through the stator winding, the magnitude of which depends on the load;

PFe is an iron loss, i.e. the excitation loss caused by the rotating magnetic field in the stator core, the magnitude of which does not depend on the load since it is largely controlled by the excitation electromotive force (proportional to the square of the input voltage of the induction motor);

Pmec is a machine loss, i.e. a power loss due to the friction generated by bearings, fans, etc., the magnitude of which does not change much;

Pad is an accessories loss, i.e. a loss caused by stator, rotor core grooves and harmonics, the magnitude of which depends on the load, but can be ignored.

(Pcu1+Pcu2) is referred to as a variable loss (copper loss) because it depends on the load and (PFe−Pmec+Pad) is referred to as an invariable loss (iron loss) because it is hardly dependent on the load, respectively. As it can be seen from the formula of efficiency η, in order to operate the induction motor in the energy saving state while $P_2$ does not change, it is necessary to increase the efficiency of the induction motor, that is, to reduce the total value of all losses.

From the principle of the induction motor, as can be seen from the energy conservation law, when the copper loss and the iron loss are the same, i.e., (Fcu1+Pcu2)=(PFe+Pmec+Pad), the induction motor has the lowest loss and the highest operation efficiency at the intersection point (optimum efficiency point) in FIG. 3.

As shown in the flowchart of FIG. 2 illustrating the method for optimizing efficiency of the induction motor, when the iron loss and the copper loss of the induction motor are $Pf=V1^2 \times g0$ and $Pc=I^2 \times (R1+R2)$ (Pcu1+Pcu2)=(PFe+Pmec+Pad), respectively, i.e. $Pf=Pc=V1^2 \times g0=I^2 \times (R1+R2)=(V1/Z)^2 \times (R1+R2)$, it becomes $V1^2/I^2=Z^2=(R1+R2)/g0$, that is, the induction motor of the induction characteristic represents the resistance load, and the operation efficiency and the power factor of the induction motor become the highest level. It can be seen that, for the fluctuating load of the induction motor, if the input voltage is changed instantaneously and accurately to Pf=Pc in real time, the induction motor can be operated at the optimum efficiency.

FIG. 5 is a flowchart of a second embodiment of the method for realizing efficiency optimization control of the induction motor according to the present invention, and implementing steps of which are described in detail.

In step 30, respective relevant parameter values of the induction motor including induction motor input current ia, ib, ic, input voltage ua, ub, uc and phase angle of the induction motor are obtained in real time Among them, the phase angle is closely related to the load factor of the induction motor. The phase angle is inversely proportional to the load factor of the induction motor. That is, the larger the phase angle, the smaller the load factor, and the smaller the phase angle, the larger the load factor.

In step 31, respective relevant parameter values of the induction motor including the operating power factor PF, the magnetic field current component id, the torque current component iq and the rotational speed ω are obtained by calculation.

In this embodiment, the magnetic field current component id and the torque current component iq can be obtained by vector conversion. Refer to the explanatory diagram showing the vectors included in the three-phase AC coordinate system and the two-phase DC coordinate system shown in FIG. 4

Three-phase excitation currents of A, B and C can be converted to the rotor torque current and the stator magnetic field current of the induction motor by coordinate transformation between the induction motor three-phase windings A, B, C and the two-phase winding. The vectors included in the two coordinate systems and the induction motor three-phase A, B and C overlap the origins of the two coordinate systems and further overlap the A axis with the a axis. Based on the principle of equivalence of the magnetomotive force, since the three-phase synthesized magnetomotive force is the same as the two-phase synthesized magnetomotive force, and therefore the projections of the two wire magnetomotive forces in the qd axis are the same, the following determinant is used.

$$\begin{bmatrix} iq \\ id \end{bmatrix} = \sqrt{\frac{2}{3}} \begin{bmatrix} 1 & -\frac{1}{2} & -\frac{3}{2} \\ 0 & \frac{\sqrt{3}}{2} & -\frac{\sqrt{3}}{2} \end{bmatrix} \begin{bmatrix} iA \\ iB \\ iC \end{bmatrix}$$

In step 32, the obtained operating power factor PF of the induction motor is compared with the command value of the power factor that has been set to obtain a deviation value, and compensation control calculation is performed on the deviation value to obtain the power factor control coefficient PFk.

In step 33, the obtained magnetic field current component Id of the induction motor is compared with the command value of the magnetic field current that has been set to obtain the deviation value, and fuzzy inference is performed on the deviation value to obtain the excitation current control coefficient Idk.

In step 34, the excitation current control coefficient Idk is applied to the calculated power factor control coefficient PFk to calculate a load factor coefficient Pk.

In step 35, the obtained torque current component Iq and the rotation speed ω of the induction motor are compared with toe command value of the rotation speed that has been set to obtain the deviation value, and the cascade control calculation is performed on the deviation value to obtain the frequency control amount Fq.

In step 36, the voltage control amount is obtained by the following equation:

$$Ud = Fq \times k1 \times Pk$$

In the above equation, Ud is a voltage control amount, Fq is a control amount of frequency (rotation speed), and k1 is a V/F coefficient (rated voltage V/rated frequency F), respectively. For example, when the rated voltage V and the rated frequency F of the induction motor are 200V and 50 Hz, respectively, the V/F coefficient is 200/50, that is, 4.0. The rated voltage V here is not limited to 200V, or the rated frequency F is not necessarily 50 Hz. The present invention may be applied to the rated voltage, for example, 60V-700V and other rated frequency, for example, 10 Hz-500 Hz. Pk represents a load factor.

In step 37, based on the obtained voltage control amount Ud and frequency control amount Fq, the SPWM generation waveform is adjusted, and the voltage regulating unit regulates three-phase input voltages ua, ub and uc of the induction motor (currents ia, ib and ic change in accordance with the change of the voltages) and frequency (speed) in real time, thereby always allowing the input power of the induction motor to adapt to the load factor of the induction motor.

In this embodiment, furthermore, a control apparatus for optimizing efficiency of the induction motor comprising an apparatus for realizing efficiency optimization control of the induction motor, an induction motor and a voltage regulator has been proposed. The control apparatus for optimizing efficiency of the induction motor is connected to the induction motor and the voltage regulating unit and used to operate the induction motor always with high efficiency.

The present embodiment also proposes an electric vehicle comprising the control apparatus for optimizing efficiency of the induction motor and the vehicle body. The control apparatus for optimizing efficiency of the induction motor is connected to the drive shaft of the vehicle body and used to operate the vehicle body at high efficiency at a variable load factor and at any rotation speed (frequency), thereby increasing the use time after charging a storage battery of the electric vehicle and the traveling distance of the electric vehicle.

Each of the steps and calculation algorithms proposed above in the present invention can be implemented in one computing device or distributed to a network connecting several computing devices or can be realized in a general computing device. As another alternative, it can be realized by a program installed in a computing device so that they can be stored in a storage device and executed by the computing device, or they can be produced on each integrated circuit module or printed circuit board, or a plurality of steps and calculation algorithms included therein can be realized in one integrated circuit module or a printed circuit board, and thus it will be obvious to one skilled in the art that the present invention is not limited to any combination of hardware and software.

In addition, the above disclosure is merely an embodiment with highest priority, and the present invention is not limited to the embodiment. Various modifications can be made to the invention by one skilled in the art. However, any modifications, rearrangements, replacements, improvements, etc., of the present invention are considered to be subject to protection according to the present invention as long as they conform to the spirit and principle of the present invention.

INDUSTRIAL APPLICABILITY

It can be applied in an electric vehicle, and the induction motor of the present invention is operated in the state of high efficiency of the minimum current and the optimum voltage under the variable load factor (for example, low load, medium load, high load, etc.) due to the influence of various factors in the course of the driving of the electric vehicle (for example, uphill slope, downhill slope, road condition, weight bearing, etc.), enabling extension of the cruising time and mileage of the charged electric storage battery of the electric vehicle.

DESCRIPTION OF REFERENCE NUMERALS 1 cascade controller
2 fuzzy inference device
3 power factor compensation controller
4 power factor operation controller
5 current conversion operator
6 speed detector
7 optimum voltage operator
8 drive waveform generator
9 load factor acquisition operator
10 power battery
11 capacitor
12 voltage regulating unit
13 drive cable
14 voltage detection sensor
15 current detection sensor
16 output terminal stand.
17 induction motor
20 apparatus for optimizing efficiency

The invention claimed is:
1. A method for controlling and optimizing efficiency of an induction motor the method comprising:
obtaining a load factor of the induction motor by detecting in real time input voltage and input current with an output terminal of the induction motor, and by detecting in real time rotation speed with a speed detector;
calculating in realtime respective relevant parameter values of the induction motor including operating power factor, torque current component, magnetic field current component and rotational speed control amount;
adjusting an input voltage and frequency of the induction motor via a voltage regulating unit in real time based on the calculated control amounts of the voltage and frequency so as to ensure that the input power of the induction motor always adapts to the load factor of the induction motor;
wherein the load factor of the induction motor is detected in real time, voltage and frequency control amounts which constantly drive the induction motor at high efficiency with the variable load factor and arbitrary frequency are calculated through an optimization algorithm;
and wherein the obtained operating power factor is compared with the power factor command value that has been set, compensation control calculation is performed on the deviation value to obtain a power factor control coefficient, and wherein the obtained magnetic field current component of the induction motor is compared with the magnetic field current command value that has been set, fuzzy inference is performed on the deviation value and the rate of change of the deviation value to obtain an excitation current control coefficient, and wherein the load factor coefficient is obtained by applying the excitation current control coefficient to the acquired power factor control coefficient, and wherein the obtained torque current component and the rotation speed of the induction motor are compared with the command value of the rotation speed that has been set, and a cascade control calculation is performed on the deviation value to obtain the frequency control amount, the voltage control amount is obtained by the following equation:

$$Ud=Fq \times k1 \times Pk$$

wherein Ud is a voltage control amount, Fq is a control amount of frequency, k1 is a V/F coefficient, and Pk is a load factor coefficient, respectively.

2. The control method for optimizing efficiency of an induction motor method according to claim 1, characterized in that the rotation speed control amount is obtained by comparing the rotation speed obtained in real time with the command value of the rotation speed that has been set and performing a cascade control calculation on the deviation.

3. A control apparatus for optimizing efficiency of an induction motor comprising:

an optimization algorithm for detecting a load factor of the induction motor in real time and calculating voltage and frequency control amounts which constantly drive the induction motor at high efficiency with the variable load factor and arbitrary frequency through the optimization algorithm; and an adjustment algorithm for adjusting input voltage and frequency of the induction motor in real time based on the calculated control amounts of the voltage and frequency so as to always allow the input power of the induction motor adapt to the load factor of the induction motor.

4. The control apparatus for optimizing efficiency of an induction motor apparatus according to claim 3, further comprising:

an acquisition algorithm for acquiring each relevant parameter value of the induction motor including the input current, the input voltage, the load factor and the rotation speed of the induction motor.

5. The control apparatus for optimizing efficiency of an induction motor apparatus according to claim 4, characterized in that specific uses of the optimization algorithm are as follows:

obtaining respective relevant parameter values of the induction motor including the operating power factor, the magnetic field current component, the torque current component, and the rotational speed control amount by calculation;

obtaining a power factor control coefficient by comparing the obtained operating power factor of the induction motor with the power factor command value that has been set and performing a compensation control calculation;

obtaining an excitation current control coefficient by comparing the obtained magnetic field current component of the induction motor with the magnetic field current command value that has been set and performing fuzzy inference on the deviation value and the rate of change of the deviation value, obtaining a load factor coefficient by applying the excitation current control coefficient to the acquired power factor control coefficient, obtaining the frequency control amount by comparing the obtained torque current component and the rotation speed of the induction motor with the command value of the rotation speed that has been set and performing a cascade control calculation on the deviation value, obtaining the voltage control amount by the following equation:

$$Ud=Fq \times k1 \times Pk$$

wherein Ud is a voltage control amount, Fq is a control amount of frequency, k1 is a V/F coefficient, and Pk is a load factor coefficient, respectively.

6. A method for generating an SPWM waveform capable of varying an arbitrary frequency and voltage for driving the AC output voltage regulating unit with the voltage control amount claimed in claim 5.

7. The control apparatus for optimizing efficiency of induction motor of claim 3, further comprising an induction motor and an output voltage regulating unit, wherein the control apparatus is connected to the AC output voltage regulating unit and the induction motor and has a function of driving the induction motor always with high efficiency.

8. The control apparatus for optimizing efficiency of induction motor of claim 7 further comprising a vehicle body, wherein the control apparatus is connected to a drive shaft of the vehicle body and has a function of driving the vehicle body at a variable load factor and an arbitrary rotation speed always with high efficiency.

* * * * *